United States Patent Office 3,286,074
Patented Nov. 15, 1966

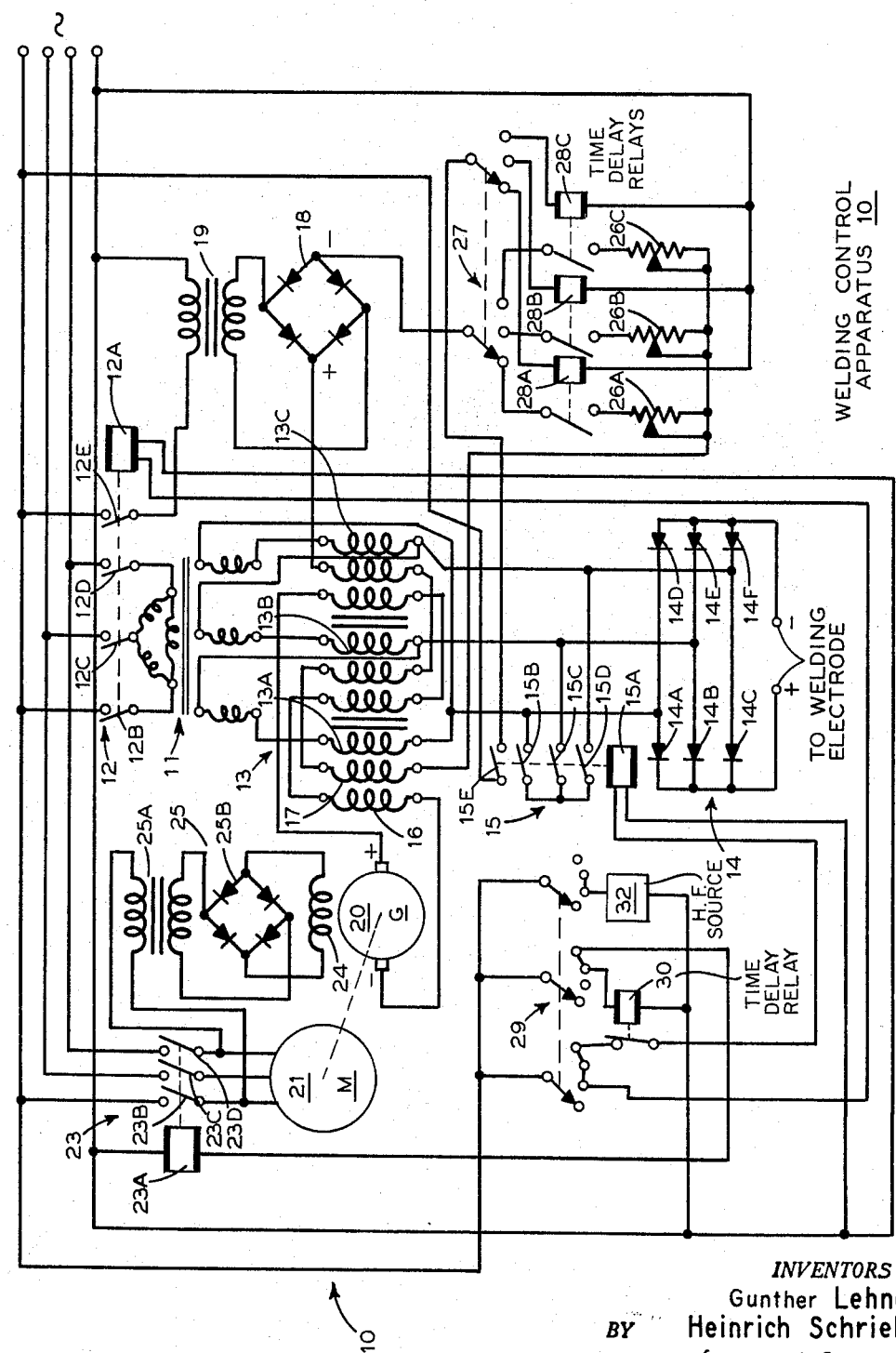

3,286,074
METHOD AND APPARATUS FOR WELDING THIN METAL STRIPS
Gunther Lehnert, Hannover-Bothfeld, and Heinrich Schrieber, Bremen, Germany, assignors to Hackethal-Draht- und Kabel-Werke Aktiengesellschaft, Hannover, Germany, a corporation of Germany
Continuation of application Ser. No. 291,527, June 28, 1963. This application Apr. 20, 1966, Ser. No. 549,753
Claims priority, application Germany, June 29, 1962, H 46,222
9 Claims. (Cl. 219—131)

This application is a continuation of copending application Serial No. 291,527, filed June 28, 1963, now abandoned.

This invention relates to a method and apparatus for welding seams in thin metal strips.

Metal tubing is frequently formed by continuously converting a thin metal strip by appropriate forming tools into tubular form with a longitudinal seam which is produced by electric arc welding with a protective gas atmosphere. This technique is of particular interest in the electric cable industry where a selected electric cable core is fed into the thin metal sheath as the same is formed with the longitudinally adjacent sheath edges being welded together to form an air-tight seam.

In order to render such cable sheath flexible, the sheath is transversely corrugated by appropriate corrugating means. The corrugations also serve to substantially increase the transverse compression strength of the sheath, thus rendering the sheath highly resistant to impact stresses. Such increased compression strength derived from the corrugations makes it possible to make cable sheath from relatively thin metal strip, which depending on the particular metal and the intended application of the cable, may vary from 0.2 to 1.0 mm.

The continuous electric arc welding of the longitudinal seam in such thin metal strips forming the sheath of cables, presents a number of problems, particularly with the high rate of speed at which the cable travels as it is being sheathed.

Thus, in the case of abutting edges of a thin metal strip, which may have a thickness of the order of 0.3 mm., there is a relatively small amount of metal available to form the melt for a proper weld. This disadvantage may be overcome by using melting electrodes. However, this in turn results in a relatively hard, heavy bead along the welded seam and considerable hardening in the seam area, as compared to other portions of the sheath, which leads to problems in the subsequent corrugating operation, as for example, the cable sheath usually tears open along the welded seam during the corrugation operation, rendering the sheath unusable.

Accordingly, it is necessary to work with a non-melting electrode in order to obtain a smooth welded seam without any increase in thickness in the seam area. The arc is ignited by means of pre-ionization of the arc path, usually with a high frequency voltage, whereby the arc and the weld point are shielded against atmospheric oxygen by an atmosphere of inert gas such as argon, to prevent the occurrence of burn-through holes. The regulation of the welding current during the welding operation usually is automatic and in response to the pull-off speed of the cable in its finished form. This can be accomplished, for instance, by passing the welding current through a D.C. premagnetized impedance coil of the magnetic amplifier type whereby the premagnetization is controlled by way of a tach-generator which is driven by the cable pull-off drive motor.

The initial current surge during the ignition of the welding arc, as a rule, results in burn holes in the seam of the preformed cold metal tube which is about to be welded. To avoid this condition, the welding electrode and the workpiece may be preheated by means of a low-current auxiliary arc which is initiated prior to the striking of the welding arc. Another known approach to the problem is to limit the initial current surge through damping resistors placed in the excitation circuit of the tach-generator. These resistors are cut out of the circuit by means of suitably set time delay relays depending on a preset value of the welding current, which in turn depends on the characteristics of the metal being welded.

It is accordingly a general object of this invention to provide an improved method of electric arc welding a thin metal strip to form a longitudinal seam therein while said strip is moving at a relatively high rate of speed.

Another object of this invention is to provide improved apparatus for welding a seam in thin metal strip as the strip is being pulled past fixed welding electrodes.

According to the invention, novel procedure and apparatus is used to solve the problem of eliminating burn holes caused during the start-up of the welding current by providing for a gradual and smooth initiation of the welding arc. The procedure relates to a welding operation wherein a thin metal strip is pulled past a fixed electrode in an atmosphere of inert protective gas and the welding current is obtained from a D.C. premagnetized impedance coil. The degree of premagnetization is controlled by a tach-generator and is related to the pull-off speed of the welded metal sheath.

There is superimposed during start-up, a constant auxiliary magnetic field on the rising magnetic field induced by the tach-generator in the impedance coil, thus counteracting the blocking or current limiting action of the impedance coil in such a manner that the saturation of the impedance coil is reached immediately or almost immediately after start-up of the tach-generator.

A further feature of the invention relates to the short circuiting of the output terminals of the impedance coil during the start-up of the system until the fluctuations of the initial current surge cease and the welding current has assumed a constant value. According to a further feature of the invention, the open circuit voltage of the impedance coil, if supplied from a 3-phase system, may be increased by connecting it in delta relation with the secondary of the main transformer.

Other objects of this invention will in part be obvious and in part hereinafter pointed out.

In the drawing, the single figure shows a circuit diagram for a welding control apparatus and procedure embodying the invention.

As shown in the figure, the welding control apparatus generally indicated at 10 is fed from the three phase A.C. power lines through a main circuit breaker 12 which includes a coil 12A and normally open contacts 12B, 12C and 12D, to a main transformer 11. In series with transformer 11 are three premagnetized toroidal impedance coils 13A, 13B and 13C of magnetic amplifier 13 to which is connected a welding current rectifier 14 comprising conventional diodes 14A to 14F.

Between the output of the magnetic amplifier 13 and the rectifier 14 there is a short circuit breaker 15, having a coil 15A and normally open contacts 15B, 15C, 15D and 15E. The magnetic amplifier 13 also includes two control windings associated with the toroidal impedance coils 13A, 13B and 13C, i.e., the main control winding 16 and the auxiliary control winding 17. Each of these control windings can receive a direct current whereby the main windings are premagnetized to controllably limit the flow of alternating current therethrough.

More particularly, the greater the direct current through the control windings 16, 17, the smaller the inductance and the greater the alternating current fed to rectifier 14; the control windings 16, 17 thus determining the operating point of the magnetic amplifier 13.

The auxiliary control winding 17 is excited with a direct current from bridge rectifier 18 which is connected to the A.C. power lines via transformer 19. The main control winding 16 is excited by a tach-generator 20, the magnitude of such exciting current being dependent on the speed of a main drive motor 21 which is mechanically coupled to the tach-generator 20.

The drive motor 21, which acts as a pulloff for the cable sheath being formed, not shown, is energized via breaker 23 having a coil 23A and normally open contacts 23B, 23C and 23D. The field 24 of the tach-generator 20 is excited through field excitation means 25 comprising a two-phase transformer 25A and a full-wave rectifier 25B of the bridge type.

In the circuit of the auxiliary control winding 17 are adjustable resistors 26A, 26B and 26C which can be selectively switched into the circuit by means of a double-pole, triple throw selector switch 27. Each of the resistors has associated with it respectively time delay relays 28A, 28B and 28C having normally open contacts. The resistors 26 serve for the setting of the basic premagnetization of the magnetic amplifier 13 through the auxiliary control winding 17, which, depending on the metal to be welded, must be premagnetized and there by unblocked to the extent required to control the welding current for the metal being welded. In other words, through proper setting of the resistors 26, it is possible to select the operating point of the impedance coils of the magnetic amplifier 13 in a manner such that the welding current satisfies the welding requirements dictated by the metal to be welded, i.e., copper, steel, etc., as well as the metal thickness.

The apparatus 10, in accordance with the invention, functions as follows. With control switch 29 in its "0" position, the system is shut off. With switch 29 in position "1," the main circuit breaker 12 is closed. At the same time, the normally closed contacts of time delay relay 30 energizes the coil 15A of the short circuit breaker 15. Its contacts close. Contacts 15B, 15C and 15D short out the output side of the toroidal impedance coils of the magnetic amplifier 13 as well as rectifier 14. Auxiliary contact 15E also closes, establishing a circuit from one of the A.C. power lines via selector switch 27 to the coil of the preselected one of the time delay relays 28 whose contacts close.

The auxiliary control winding 17 is therefore excited through rectifier 18 over one of the resistors 26A, 26B or 26C and the closed contact of the preselected time delay relay 28A, 28B or 28C in accordance with the position of selector switch 27. The rectifier 18 is fed from the A.C. lines and transformer 19 through now closed auxiliary contact 12E of the circuit breaker 12. The D.C. excitation of auxiliary winding 17 is so dimensioned that the blocking action of impedance coils 13A, 13B and 13C is eliminated when the short circuit on the secondary side will be removed so that the welding arc will be ignited.

In addition, the high frequency source 32 is energized so that an ionization of the area about the arc takes place.

The system is in the following state just prior to the movement of switch 29 to position "2." The tubing to be welded is stationary. The high frequency ignition source 32 is energized and the magnetic amplifier 13 is being supplied with alternating current. However, the output side of the magnetic amplifier 13 is short circuited so that no welding current flows. At this time D.C. current flows through auxiliary winding 17, which induces a constant premagnetizing auxiliary field so that the magnetic amplifier 13 can deliver sufficient welding current immediately when the short circuit is opened. No current is flowing through main winding 16 since tach-generator 20 is not operating.

In position "2" of the control switch 29, the motor circuit breaker 23 is actuated. Accordingly, field excitation 25 of tach-generator 20 is energized and the pulloff drive motor 21 is activated, through the mechanical coupling thereof. The tach-generator 20 as it comes up to speed, excites the main control winding 16. Simultaneously, the time delay relay 30 is actuated after a time interval corresponding to the duration of the initial current surge in the toroidal impedance coils 13A, 13B and 13C deactuates short circuit breaker 15, thereby removing the short circuit on the output side of the impedance coils and rectifier 14.

This, in turn, makes it possible for the welding current to flow so that the arc is ignited by means of the conventional high frequency ignition signal source 32. At the same time, the auxiliary contact 15E of the short circuit breaker 15 opens and the excitation coils of time delay relays 28A, 28B and 28C via selector switch 27 and adjustable resistors 26, which are located in the auxiliary control winding 17 circuit, are switched off. After a time delay, contacts of the preselected time delay relay 28 open to interrupt current flow to the rectifier circuit 18 and thereby the excitation of the auxiliary control winding 17 at that time when the tach-generator 20 has reached such a speed that the current generated in the main control winding 16 of the magnetic amplifier 13 is high enough to decrease the blocking effect of the toroidal impedance coils; then the premagnetization of such toroidal impedance coils 13A, 13B and 13C of magnetic amplifier 13 is accomplished only through the main control winding 16.

In other words, the auxiliary control winding 17 is cut out when the speed of tach-generator 20 has reached a value at which enough direct current is produced so that the premagnetization of the main control winding 16 of the magnetic amplifier 13 makes possible the operation at the aforesaid predetermined operating point on the characteristic of the impedance coils 13A, 13B and 13C.

More particularly, at the start of switch position "2," main control winding 16 is slowly energized following the starting of tach-generator 20. The increasing magnetic field, resulting from the speedup of tach-generator 20, is by itself, still too weak to cause magnetic amplifier 13 to pass sufficient welding current. However, the increasing magnetic field generated by main control winding 16 is superimposed on the constant magnetic field generated by auxiliary control winding 17. The combined magnetic fields are of sufficient magnitude to cause the flow of welding current.

When the tach-generator 20 reaches a speed at which the current flowing through the main control winding 16 will attain a value sufficient to cause the magnetic field generated thereby to be sufficient by itself to unblock the magnetic amplifier sufficiently to pass welding current, the current flow through the auxiliary winding 17 is shut off. However, it is seen that winding 17 functions to supply an immediate, soft start of sufficient welding current during the time when the tach-generator 20 is running too slowly.

In position "3" of control switch 29, which is the operating position, the high frequency ignition signal source 32, which in the previous switch positions "1" and "2" was continuously in operation, is now cut out. The tach-generator 20 then takes over in a known manner the control of the operating point of the magnetic amplifier 13 through the limitation of the premagnetization effect by means of the adjustable resistors (not shown) in the excitation circuit 25 of the tach-generator 20.

The process and apparatus of this invention makes possible a smooth impact-free ignition and start-up of the welding arc, eliminating burn holes or other irregularities in the welded seam caused by switching surges or fluctuations of the welding current during the speed build-up of the tach-generator 20.

The invention also makes it possible, whenever necessary, to interrupt the welding operation and restart the same at any time thereafter without any irregularities or burn holes occurring in the welded seam during the restarting operation. This is of particular importance in the manufacture of welded cable sheaths since in this case, frequently faults in the cable must be repaired, which faults are discovered only during the feeding of the cable core into the freshly formed tubing which is about to be welded. Such faults frequently can only be repaired with the core at a standstill which requires a stoppage of the seam welding operation and restart of the welding after the repair is completed.

When applied to D.C. welding, the effect of the short-circuiting of the output of the magnetic amplifier output can also be accomplished by short circuiting the output of the rectifier. This will not affect the proper functioning of the system, in accordance with the invention.

The invention is not limited to the D.C. arc welding system hereinbefore described. It can also be applied to A.C. arc welding systems of similar basic layout, whereby for instance rectifier 14 is eliminated and main transformer 11 and magnetic amplifier 13 are laid out in a two phase arrangement. Furthermore, in accordance with the invention, a D.C. motor may replace the three-phase drive motor 21, and the rotor voltage of such D.C. motor may then be used for the speed responsive D.C. premagnetization of the magnetic amplifier 13 through the main control winding 16. This would eliminate the need for the separate tach-generator 20.

The adjustable resistors 26 with their associated time delay relays 28 can be omitted since the same results can be achieved with other known means. Thus, by selecting an optimum operating point for the magnetic amplifier 13 which is related to the metal being welded, through the use of an induced auxiliary D.C. magnetic field of predetermined strength over which is superimposed the normal speed dependent D.C. magnetic field, and cutting off the auxiliary magnetic field when the speed dependent magnetic field has reached a value where it can take over the regulation of the operating point of the magnetic amplifier in accordance with the operating speed of the welding operation, the control of the welding operation is carried out in accordance with the invention.

As various changes might be made in the embodiment of the invention herein disclosed without departing from the spirit thereof, it is understood that all matter herein shown or described shall be deemed illustrative and not limiting except as set forth in the appended claims.

What is claimed is:

1. The method of electrically arc welding a seam between adjacent edges of thin metal strip which is pulled continuously past a stationary electrode in an atmosphere of inert gas comprising the steps of supplying current to said electrodes from controllable magnetic amplifier means, first controlling the current output of said magnetic amplifier means by a fixed predetermined direct current, and second controlling the current output of said magnetic amplifier means in accordance with the speed at which said metal strip is pulled past said stationary electrodes only after the movement of said metal strip reaches a predetermined speed so that at all times there is a current output from the electrode sufficient at least to strike a welding arc.

2. The method of claim 1 including the step of initially short circuiting the current input of said magnetic amplifier means for a given time interval to prevent transient current fluctuations from reaching said electrodes.

3. Apparatus for electric arc welding a thin metal strip which is continuously pulled past fixed electrodes, comprising inductance means having inputs connected to a source of alternating current and outputs, means for connecting said outputs to said fixed electrodes, a main direct-current control winding for controlling the operating inductance of said inductance means, direct current generating means connected to said main direct-current control winding for generating a direct current having a value related to the speed of movement of said metal strip, an auxiliary direct-current control winding for establishing an initial operating inductance for said inductance means, a source of constant direct current and means for initially connecting said source of direct current to said auxiliary control winding and for disconnecting said source therefrom after said direct current generating means is generating a direct current of a given current value, the magnitude of the direct current from said source of constant direct current being sufficient for the ignition and maintenance of the welding arc.

4. Apparatus as in claim 3 and including means for initially short circuiting the output of said inductance means for a predetermined time interval for damping out switching transients.

5. Apparatus as in claim 3 including a transformer having a primary connected to a three phase supply of alternating current, and said inductance means including three inductance coils and means for connecting said inductance coils to the secondary winding of said transformer to form a delta circuit.

6. Apparatus as in claim 3 wherein rectifier means connects the output of said inductance means to said electrodes.

7. Apparatus as in claim 3 including means for controllably short circuiting the output of said inductance means.

8. Apparatus as in claim 7 wherein the means for short circuiting the output of said inductance means is controlled by time delay means which is actuated simultaneously with the initiation of operation and is deactuated upon excitation of said main direct control winding.

9. Apparatus as in claim 8 wherein said time delay means further includes delay control means which is actuated when said time delay means is deactuated for deactivating said auxiliary direct control winding.

References Cited by the Examiner

UNITED STATES PATENTS

| | | | |
|---|---|---|---|
| 1,278,984 | 9/1918 | Morton | 219—124 |
| 2,089,014 | 8/1937 | Bucknam et al. | 219—61 X |
| 2,460,990 | 2/1949 | Kratz et al. | 219—131 |
| 2,488,987 | 11/1949 | Schmerber | 219—131 X |
| 2,951,972 | 9/1960 | Pomazal | 219—131 X |

JOSEPH V. TRUHE, *Primary Examiner.*